US012746918B2

(12) United States Patent
Patel et al.

(10) Patent No.: US 12,746,918 B2
(45) Date of Patent: Sep. 29, 2026

(54) TRAJECTORY PLANNING SYSTEM CALCULATING A LATERALLY OFFSET TRAJECTORY FOR A VEHICLE

(71) Applicant: GM Global Technology Operations LLC, Detroit, MI (US)

(72) Inventors: Harsh Ketan Patel, New Hudson, MI (US); Paul A. Adam, Milford, MI (US); Tetyana V. Mamchuk, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 159 days.

(21) Appl. No.: 18/956,435

(22) Filed: Nov. 22, 2024

(65) Prior Publication Data

US 2026/0145671 A1 May 28, 2026

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/20* (2013.01); *B60W 30/18163* (2013.01); *B60W 2050/0028* (2013.01); *B60W 2552/53* (2020.02); *B60W 2554/4041* (2020.02); *B60W 2556/10* (2020.02); *B60W 2754/20* (2020.02)

(58) Field of Classification Search
CPC ................. B60W 10/20; B60W 30/12; B60W 30/18163; B60W 2050/0028; B60W 2552/53; B60W 2554/4041; B60W 2554/801; B60W 2556/10; B60W 2754/20
See application file for complete search history.

(56) References Cited

U.S. PATENT DOCUMENTS

| | | | | |
|---|---|---|---|---|
| 6,473,678 | B1 * | 10/2002 | Satoh | B62D 1/28 340/439 |
| 2015/0210318 | A1 * | 7/2015 | Takeda | B62D 6/008 701/41 |

(Continued)

FOREIGN PATENT DOCUMENTS

| | | | | |
|---|---|---|---|---|
| CN | 111717198 A | | 9/2020 | |
| CN | 116238494 A | * | 6/2023 | B60W 30/12 |

(Continued)

*Primary Examiner* — John M Zaleskas
(74) *Attorney, Agent, or Firm* — Vivacqua Crane, PLLC

(57) ABSTRACT

A trajectory planning system that calculates a laterally offset trajectory based on a maximum allowable in-lane lateral offset with respect to the center of a host lane of a vehicle includes one or more controllers including one or more processors that execute instructions to monitor perception data collected by a plurality of perception sensors until determining an occurrence of an offset event requiring the vehicle to deviate from an original trajectory. In response to determining the occurrence of the offset event, the one or more controllers calculate a non-linear error component of the maximum allowable in-lane lateral offset. The one or more controllers update the laterally offset trajectory of the vehicle with the maximum allowable in-lane lateral offset and apply a rate limiter to the maximum allowable in-lane lateral offset in real-time while instructing the vehicle to travel along the laterally offset trajectory.

20 Claims, 7 Drawing Sheets

(51) Int. Cl.
*B60W 30/18* (2012.01)
*B60W 50/00* (2006.01)

(56) References Cited

U.S. PATENT DOCUMENTS

| | | | | |
|---|---|---|---|---|
| 2016/0114832 | A1* | 4/2016 | Taniguchi | B62D 6/04 701/41 |
| 2016/0375901 | A1* | 12/2016 | Di Cairano | B60W 30/09 701/26 |
| 2019/0186948 | A1* | 6/2019 | Hayee | B60Q 9/00 |
| 2020/0189582 | A1* | 6/2020 | Fukushige | B60W 30/10 |
| 2020/0207353 | A1* | 7/2020 | Chen | B60W 30/18163 |
| 2020/0377088 | A1* | 12/2020 | Fukushige | B60W 40/105 |
| 2020/0377089 | A1* | 12/2020 | Fukushige | B60W 30/12 |
| 2021/0155267 | A1* | 5/2021 | Goto | B60W 60/0027 |
| 2022/0048566 | A1* | 2/2022 | Prasad Challa | B60W 30/09 |
| 2022/0266852 | A1* | 8/2022 | Khayyer | B60W 40/08 |
| 2022/0388508 | A1* | 12/2022 | Baek | B60W 30/12 |
| 2023/0373523 | A1* | 11/2023 | Kassar | B60W 30/12 |
| 2023/0391324 | A1 | 12/2023 | Zarringhalam et al. | |
| 2025/0249900 | A1* | 8/2025 | Ge | B60W 30/12 |

FOREIGN PATENT DOCUMENTS

| | | | | | |
|---|---|---|---|---|---|
| CN | 117508164 | A | | 2/2024 | |
| GB | 2578916 | A | * | 6/2020 | B60W 30/18163 |

* cited by examiner

TRAJECTORY PLANNING SYSTEM CALCULATING A LATERALLY OFFSET TRAJECTORY FOR A VEHICLE

INTRODUCTION

The present disclosure relates to a trajectory planning system for a vehicle that calculates a laterally offset trajectory based on a maximum allowable in-lane lateral offset measured with respect to the center of the vehicle's host lane. The maximum allowable in-lane lateral offset is dynamically adjusted based on non-linear error created in real-time as the vehicle deviates from the laterally offset trajectory.

Autonomous vehicles employ motion planning and control for determining trajectories that define a vehicle's position, velocity, and acceleration over time. It is to be appreciated that the trajectory of a vehicle should result in a minimal amount of lateral acceleration and jerk, be collision-free, and also be feasible and rational. Specifically, the feasibility of a trajectory may be accomplished by providing closed-loop feedback from the control logic to the planning logic, where the control logic communicates its internal parameters to the planning logic. However, there are many instances when the performance of a control system may deviate from normal operation because of a variety of different factors such as, but not limited to, non-operational components, degradation of mechanical components, and extended time horizon disturbances. One example of an extended time horizon disturbance is oscillatory vehicle behavior, which may be caused by a section of road experiencing pavement distress or by repeated gusts of wind blow from the same direction.

Thus, while current systems achieve their intended purpose, there is a need in the art for recognizing the true performance of a control system based on real-time observations, and adjusting the trajectory of the vehicle based on the real-time observations.

SUMMARY

According to several aspects, a trajectory planning system that calculates a laterally offset trajectory based on a maximum allowable in-lane lateral offset with respect to the center of a host lane of a vehicle is disclosed. The trajectory planning system includes one or more controllers that receive perception data indicative of an exterior environment surrounding the vehicle collected by a plurality of perception sensors that are part of the vehicle. The one or more controllers include one or more processors that execute instructions to monitor the perception data collected by the plurality of perception sensors until determining an occurrence of an offset event requiring the vehicle to deviate from an original trajectory. In response to determining the occurrence of the offset event, the one or more controllers calculate a non-linear error component of the maximum allowable in-lane lateral offset with respect to the center of a host lane, where the non-linear error component is calculated as a function of a target lane position error across a relevant time window. The one or more controllers calculate the maximum allowable in-lane lateral offset based on a lane width of the host lane, a width of the vehicle, the target lane position error, and a buffer distance, wherein the maximum allowable in-lane lateral offset is dynamically adjusted based on non-linear error created in real-time as the vehicle deviates from the laterally offset trajectory. The one or more controllers compare the maximum allowable in-lane lateral offset with an arbitrated in-lane lateral offset value, wherein the arbitrated in-lane lateral offset value and the maximum allowable in-lane lateral offset are both oriented in the same direction. In response to determining the arbitrated in-lane lateral offset value is greater than the maximum allowable in-lane lateral offset, the one or more controllers update the laterally offset trajectory of the vehicle with the maximum allowable in-lane lateral offset and apply a rate limiter to the maximum allowable in-lane lateral offset in real-time while instructing the vehicle to travel along the laterally offset trajectory.

In another aspect, the one or more controllers execute instructions to in response to determining the arbitrated in-lane lateral offset value is equal to or less than the maximum allowable in-lane lateral offset, update the laterally offset trajectory of the vehicle with the arbitrated in-lane lateral offset value and apply a rate limiter to the arbitrated in-lane lateral offset value in real-time while instructing the vehicle to travel along the laterally offset trajectory.

In yet another aspect, the target lane position error is determined based on a root mean squared approach.

In an aspect, the target lane position error is determined by:

$$\text{TgtLane\_Position\_Error} = \frac{\sqrt{\sum_{Buffer0}^{MaxSamplebuffersize} TgtErr^2}}{\text{Max Sample Buffer Size}}$$

where TgtLane_Position_Error represents the target lane position error, Max Sample Buffer Size represents a maximum number of data samples allocated, and TgtErr represents an error between between a planned target vehicle position and an actual vehicle lateral position.

In an aspect, the target lane position error is determined based on a standard deviation approach.

In another aspect, the target lane position error is determined by:

$$\text{TgtLane\_Position\_Error} = \frac{\sqrt{\sum_{Buffer0}^{MaxSamplebuffersize} (TgtErr - \text{TgtErr\_Mean})^2}}{\text{Max Sample Buffer Size}}$$

wherein TgtLane_Position_Error represents the target lane position error, Max Sample Buffer Size represents a maximum number of data samples allocated, and TgtErr_Mean represents an accumulated average of error between a planned target vehicle position and an actual vehicle lateral position.

In yet another aspect, the buffer distance is measured between a lane boundary of the host lane and a please-ability boundary disposed along the host lane, wherein the lane boundary is positioned along an opposite side of the host lane from where the offset event occurs.

In an aspect, the maximum allowable in-lane lateral offset is determined based on:

$$\text{Max Allowed Lateral Offset} = \frac{(\text{Lane Width} - \text{Host vehicle width})}{2} - \text{TgtLane\_Position\_Error} - \text{Buffer}$$

where TgtLane_Position_Error represents the target lane position error, Lane Width represents the lane width of the host lane, Host vehicle width represents the width of the vehicle, and Buffer represents the buffer distance.

In another aspect, the arbitrated in-lane lateral offset value represents a current lateral offset value of the laterally offset trajectory of the vehicle.

In yet another aspect, the offset event is one of the following: a moving obstacle traveling in an adjacent lane that encroaches upon the host lane, aggressive road curvature, a driver request, and a reaction to avoid oncoming traffic.

In an aspect, the offset event is the moving obstacle traveling in the adjacent lane, and where the moving obstacle is another vehicle.

In another aspect, the one or more controllers store a one-dimensional look-up table that indicates values of the rate limiter based on the target lane position error.

In yet another aspect, the one or more controllers execute instructions to monitor the perception data collected by the plurality of perception sensors indicative of the exterior environment surrounding the vehicle until detecting the presence of a side obstacle located in a bordering lane and in response to detecting the presence of a side obstacle, determine the vehicle is about to perform a lane change maneuver, wherein the vehicle follows a laterally offset lane change trajectory while executing the lane change maneuver to switch from the host lane to a neighboring lane when executing the lane change maneuver, and the bordering lane that includes the side obstacle is adjacent to the neighboring lane.

In an aspect, the one or more controllers execute instructions to in response to determining the presence of the side obstacle and determining the vehicle is about to perform the lane change maneuver, calculate an estimated lateral separation distance between the vehicle and the side obstacle based on an original trajectory of the vehicle, compare the compare the estimated lateral separation distance with a lateral separation threshold distance measured between the vehicle and the side obstacle, and in response to determining the estimated lateral separation distance is less than the lateral separation threshold distance, calculate a target lane lateral offset error.

In another aspect, the one or more controllers execute instructions to compare the target lane lateral offset error with a threshold maximum allowable error value and in response to determining the target lane lateral offset error is less than the threshold maximum allowable error value, calculate a lateral offset correction value, where the lateral offset correction value maintains the lateral separation threshold distance measured between the vehicle and the side obstacle as the vehicle follows the laterally offset lane change trajectory.

In yet another aspect, a method for calculating a laterally offset trajectory based on a maximum allowable in-lane lateral offset with respect to the center of a host lane of a vehicle is disclosed. The method includes monitoring, by one or more controllers, perception data collected by a plurality of perception sensors until determining an occurrence of an offset event requiring the vehicle to deviate from an original trajectory. The method includes in response to determining the occurrence of the offset event, calculating a non-linear error component of the maximum allowable in-lane lateral offset with respect to the center of a host lane. The non-linear error component is calculated as a function of a target lane position error across a relevant time window. The method includes calculating the maximum allowable in-lane lateral offset based on a lane width of the host lane, a width of the vehicle, the target lane position error, and a buffer distance, wherein the maximum allowable in-lane lateral offset is dynamically adjusted based on non-linear error created in real-time as the vehicle deviates from the laterally offset trajectory. The method includes comparing the maximum allowable in-lane lateral offset with an arbitrated in-lane lateral offset value, where the arbitrated in-lane lateral offset value and the maximum allowable in-lane lateral offset are both oriented in the same direction. The method includes in response to determining the arbitrated in-lane lateral offset value is greater than the maximum allowable in-lane lateral offset, updating the laterally offset trajectory of the vehicle with the maximum allowable in-lane lateral offset and applying a rate limiter to the maximum allowable in-lane lateral offset in real-time while instructing the vehicle to travel along the laterally offset trajectory.

In another aspect, the method further includes in response to determining the arbitrated in-lane lateral offset value is equal to or less than the maximum allowable in-lane lateral offset, updating the laterally offset trajectory of the vehicle with the arbitrated in-lane lateral offset value and applying a rate limiter to the arbitrated in-lane lateral offset value in real-time while instructing the vehicle to travel along the laterally offset trajectory.

In yet another aspect, the method includes determining the target lane position error based on a root mean squared approach.

In an aspect, the method includes determining the target lane position error based on a standard deviation approach.

In another aspect, a trajectory planning system that calculates a laterally offset trajectory based on a maximum allowable in-lane lateral offset with respect to the center of a host lane of a vehicle is disclosed. The trajectory planning system includes one or more controllers that receive perception data indicative of an exterior environment surrounding the vehicle collected by a plurality of perception sensors that are part of the vehicle. The one or more controllers include one or more processors that execute instructions to monitor the perception data collected by the plurality of perception sensors until determining an occurrence of an offset event requiring the vehicle to deviate from an original trajectory. In response to determining the occurrence of the offset event, the one or more controllers calculate a non-linear error component of the maximum allowable in-lane lateral offset with respect to the center of a host lane, where the non-linear error component is calculated as a function of a target lane position error across a relevant time window. The one or more controllers calculate the maximum allowable in-lane lateral offset based on a lane width of the host lane, a width of the vehicle, the target lane position error, and a buffer distance, wherein the maximum allowable in-lane lateral offset is dynamically adjusted based on non-linear error created in real-time as the vehicle deviates from the laterally offset trajectory. The one or more controllers compare the maximum allowable in-lane lateral offset with an arbitrated in-lane lateral offset value, where the arbitrated in-lane lateral offset value and the maximum allowable in-lane lateral offset are both oriented in the same direction. In response to determining the arbitrated in-lane lateral offset value is greater than the maximum allowable in-lane lateral offset, the one or more controllers update the laterally offset trajectory of the vehicle with the maximum allowable in-lane lateral offset. The one or more controllers apply a rate limiter to the maximum allowable in-lane lateral offset in real-time while instructing the vehicle to travel along the laterally offset trajectory. The one or more controllers monitor the perception data collected by the plurality of perception sensors indicative of the exterior environment surrounding the vehicle until detecting the presence of a side obstacle located in a bordering lane. In response to detecting the presence of a side obstacle, the one or more controllers determine the vehicle is about to perform a lane change maneuver, where the vehicle follows a laterally offset lane change trajectory while executing the lane change maneuver to switch from the host lane to a neighboring lane when executing the lane change maneuver, and the bordering lane that includes the side obstacle is adjacent to the neighboring lane. In response to determining the presence of the side obstacle and determining the vehicle is about to perform the lane change maneuver, the one or more controllers calculate an estimated lateral separation distance between the vehicle and the side obstacle based on an original trajectory of the vehicle. The one or more controllers compare the compare the estimated lateral separation distance with a lateral separation threshold distance measured between the vehicle and the side obstacle. In response to determining the estimated lateral separation distance is less than the lateral separation threshold distance, the one or more controllers calculate a target lane lateral offset error. The one or more controllers compare the target lane lateral offset error with a threshold maximum allowable error value and in response to determining the target lane lateral offset error is less than the threshold maximum allowable error value, calculate a lateral offset correction value, wherein the lateral offset correction value maintains the lateral separation threshold distance measured between the vehicle and the side obstacle as the vehicle follows the laterally offset lane change trajectory.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
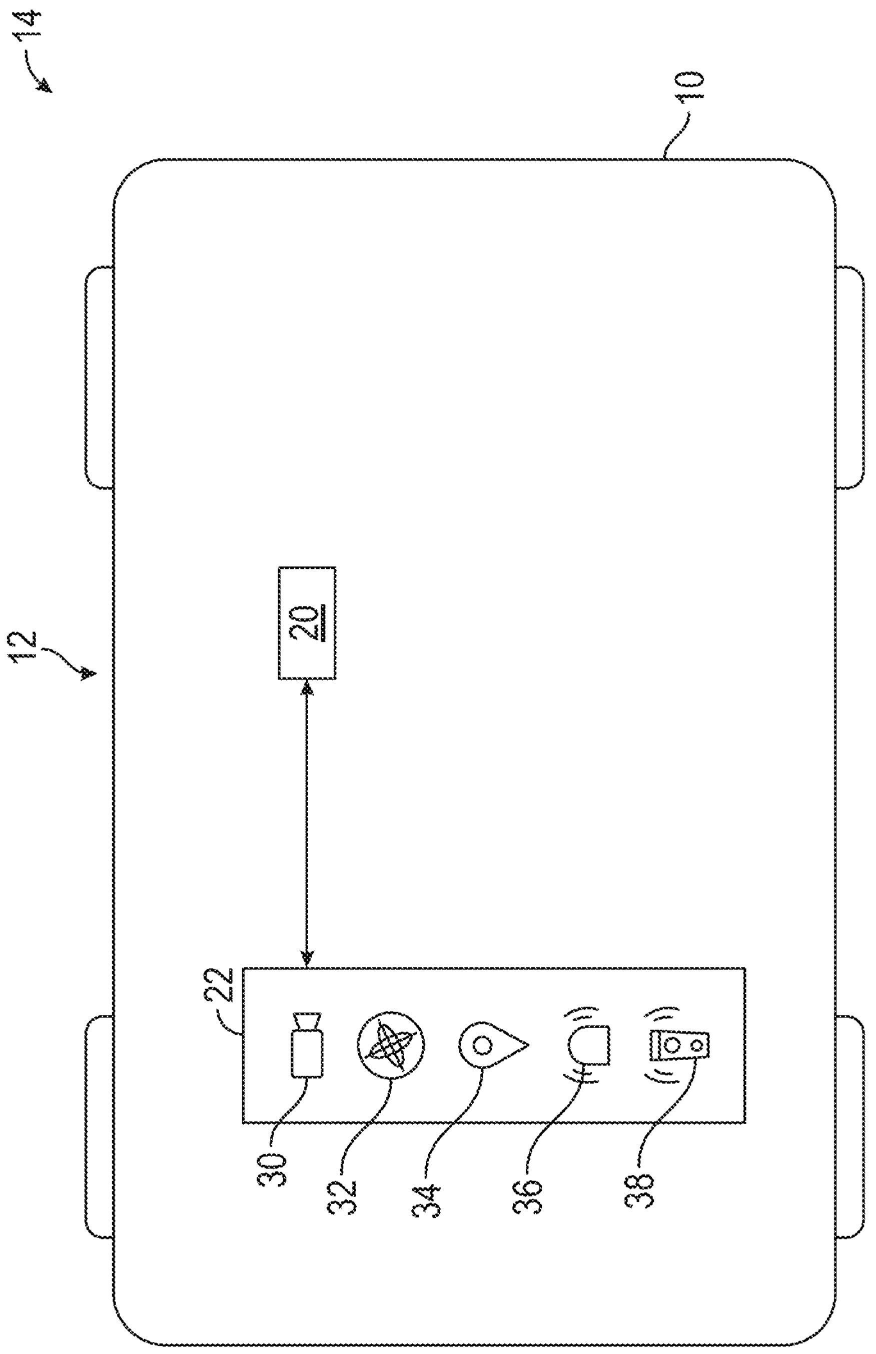
FIG. 1 illustrates a schematic diagram of the disclosed trajectory planning system for a vehicle that includes one or more controllers in electronic communication with a plurality of perception sensors, according to an exemplary embodiment.

Referring to FIG. 1, a schematic diagram of a vehicle 10 including the disclosed trajectory planning system 12 is illustrated. It is to be appreciated that the vehicle 10 may be any type of vehicle such as, but not limited to, a sedan, truck, sport utility vehicle, van, or motor home. It is also to be appreciated that the trajectory planning system 12 is part of an autonomous driving system. Specifically, the trajectory planning system 12 may be part of a fully autonomous driving system such as an automated driving system (ADS) or, alternatively, a semi-autonomous driving system such an advanced driver assistance system (ADAS). The trajectory planning system 12 includes one or more controllers 20 in electronic communication with a plurality of perception sensors 22 configured to collect perception data indicative of an exterior environment 14 surrounding the vehicle 10. In the non-limiting embodiment as shown in FIG. 1, the plurality of perception sensors 22 include one or more in-vehicle cameras 30, an inertial measurement unit (IMU) 32, a global positioning system (GPS) 34, radar 36, and LIDAR 38, however, is to be appreciated that different or additional sensors may be used as well.

Figure 2:
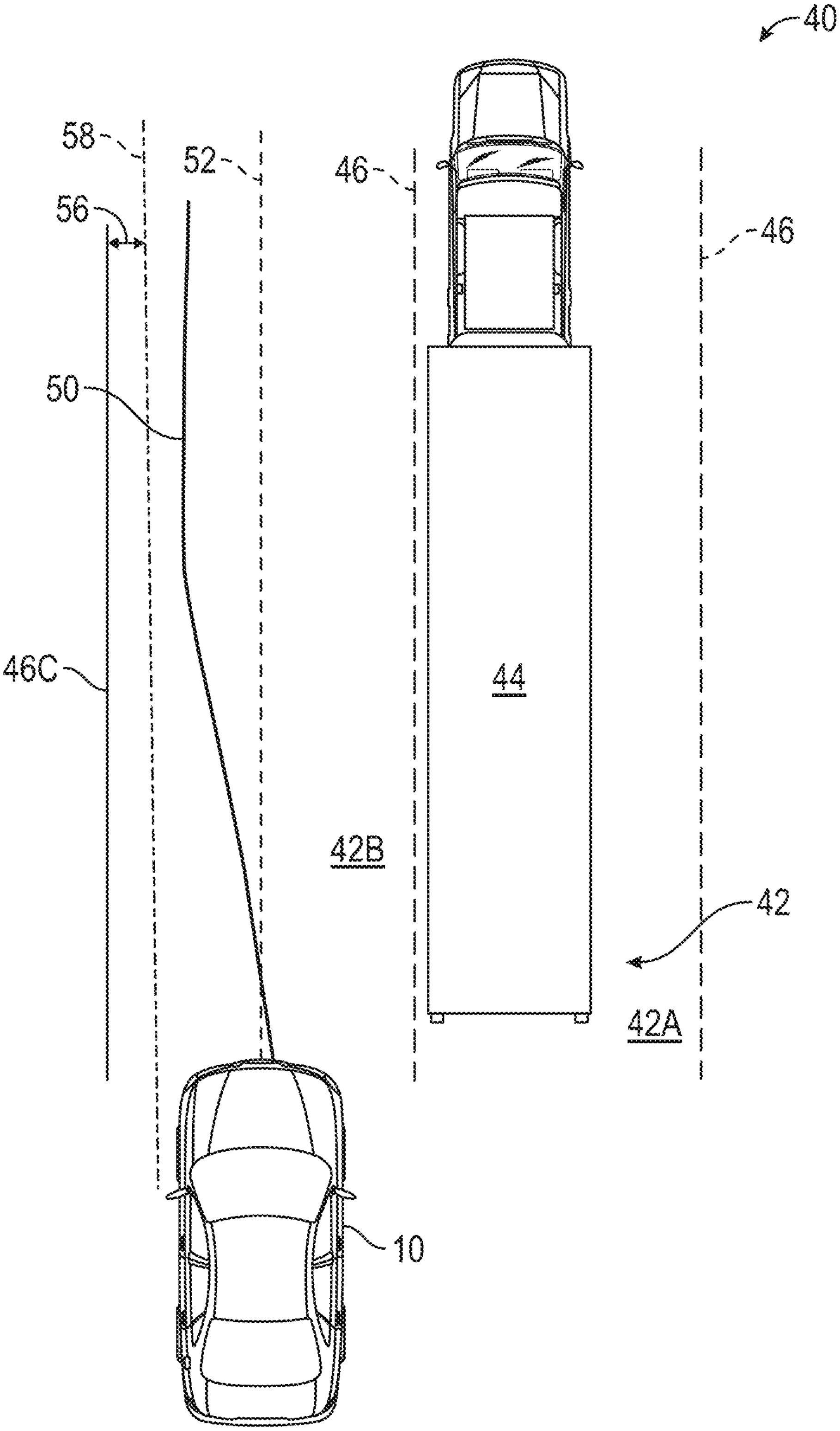
FIG. 2 is a schematic diagram of the vehicle shown in FIG. 1 traveling along a host lane while following a laterally offset trajectory in response to detecting the presence of a moving obstacle encroaching upon the host lane, according to an exemplary embodiment.

FIG. 2 is a diagram of the vehicle 10 shown in FIG. 1 traveling along a roadway 40. As seen in FIG. 2, the roadway 40 is divided into two lanes 42, where a moving obstacle 44 travels in a right or adjacent lane 42A and the vehicle 10 travels in a left or host lane 42B, and plurality of lane boundaries 46 define the lanes 42A, 42B. The dashed lines of the lane boundaries 46 denote crossable markers, while solid lines of the lane boundaries 46A denote non-crossable lane boundaries 46. FIG. 2 illustrates a laterally offset trajectory 50 of the vehicle 10 determined by the trajectory planning system 12 (FIG. 1), where the laterally offset trajectory 50 is based on a maximum allowable in-lane lateral offset with respect to a center 52 of the host lane 42B that the vehicle 10 is traveling along. The one or more controllers 20 of the trajectory planning system 12 (FIG. 1) calculate the laterally offset trajectory 50 in response to determining the presence of an offset event that requires the vehicle 10 to deviate from an original trajectory. It is to be appreciated that the maximum allowable in-lane lateral offset with respect to the center 52 of the host lane 42B is dynamically adjusted based on non-linear error created in real-time as the vehicle 10 deviates from the laterally offset trajectory 50. Specifically, the non-linear error represents the deviation between the laterally offset trajectory 50 and an actual trajectory 60 (shown in FIG. 3) of the vehicle 10.

Some examples of the offset events that require the vehicle 10 to deviate from its original trajectory include, but are not limited to, a moving obstacle traveling in an adjacent lane that encroaches upon the host lane 42B, aggressive road curvature, a driver request, and a reaction to avoid oncoming traffic. Some examples of the driver request include, but are not limited to, a maneuver to avoid construction objects such as barrels or barriers, to create an offset away from an obstacle, and to avoid potholes. In the example as shown in FIG. 2, the offset event is the moving obstacle 44, which is another vehicle. In particular, the moving obstacle 44 is a semi-truck encroaching upon the host lane 42B that the vehicle 10 is traveling along. The host lane 42B is bounded by a non-crossable lane boundary 46C to the left of the vehicle 10, where the non-crossable lane boundary 46C represents a limit of the lateral position of the vehicle 10 within the host lane 42B. It is to be appreciated that the maximum allowable in-lane lateral offset compensates for overshoot introduced by control error while also maintaining a lateral position of the vehicle 10 within its host lane 42B of travel as the vehicle 10 travels along the laterally offset trajectory 50.

As seen in FIG. 2, the maximum allowable in-lane lateral offset determined by the trajectory planning system 12 is constrained by a buffer distance 56, where the buffer distance 56 is measured between the non-crossable lane boundary 46C of the host lane 42B and a please-ability boundary 58 disposed along the host lane 42B. The non-crossable lane boundary 46C is positioned along the opposite side of the host lane 42B from where the offset event occurs. The buffer distance 56 is disposed along the host lane 42B and is dimensioned to ensure that the vehicle 10 does not operate along the non-crossable lane boundary 46C when executing the laterally offset trajectory 50. Similarly, the please-ability boundary 58 is positioned to ensure that the vehicle 10 does not operate along the non-crossable lane boundary 46C when executing the laterally offset trajectory 50. It is to be appreciated that the maximum allowable in-lane lateral offset ensures that the vehicle 10 maintains the lateral position of the vehicle 10 within its host lane 42B of travel while operating within the please-ability boundary 58.

Referring to both FIGS. 1 and 2, determining the maximum allowable in-lane lateral offset shall now be described. The one or more controllers 20 of the vehicle 10 may monitor the perception data indicative of the exterior environment 14 surrounding the vehicle 10 to detect the offset event. For example, as seen in FIG. 2, the one or more controllers 20 may determine the moving obstacle 44 (the semi-truck) is encroaching upon the host lane 42B the vehicle 10 is traveling along. In response to determining the offset event, the one or more controllers 20 of the vehicle 10 may then confirm that the autonomous driving features have been activated. The one or more controllers 20 of the trajectory planning system 12 may then position the vehicle 10 within the host lane 42B of travel so as to avoid contact with the lane boundaries 46 and the please-ability boundary 58, and to avoid overshoot introduced by the control error as the vehicle 10 travels along the laterally offset trajectory 50.

The one or more controllers 20 may then calculate the maximum allowable in-lane lateral offset. Specifically, the one or more controllers 20 may first calculate the non-linear error component of the maximum allowable in-lane lateral offset, where the non-linear error component is a feedforward term that compensates for the overshoot introduced by the control error. It is to be appreciated that the non-linear error component is calculated as a function of a target lane position error across a relevant time window. The target lane position error is a moving average of error between the laterally offset trajectory 50 and the actual trajectory 60 (shown in FIG. 3) of the vehicle 10 across the relevant time window, where the relevant time window is measured as the vehicle 10 travels along the laterally offset trajectory 50. The relevant time window is of a duration over which the data samples are collected. In many applications the relevant time window may range from about one to about thirty seconds, however, the relevant time window may be adjusted outside of this range as well. For example, to make the trajectory planning system 12 more responsive to a single impulse, then the relevant time window is shortened.

Figure 3:
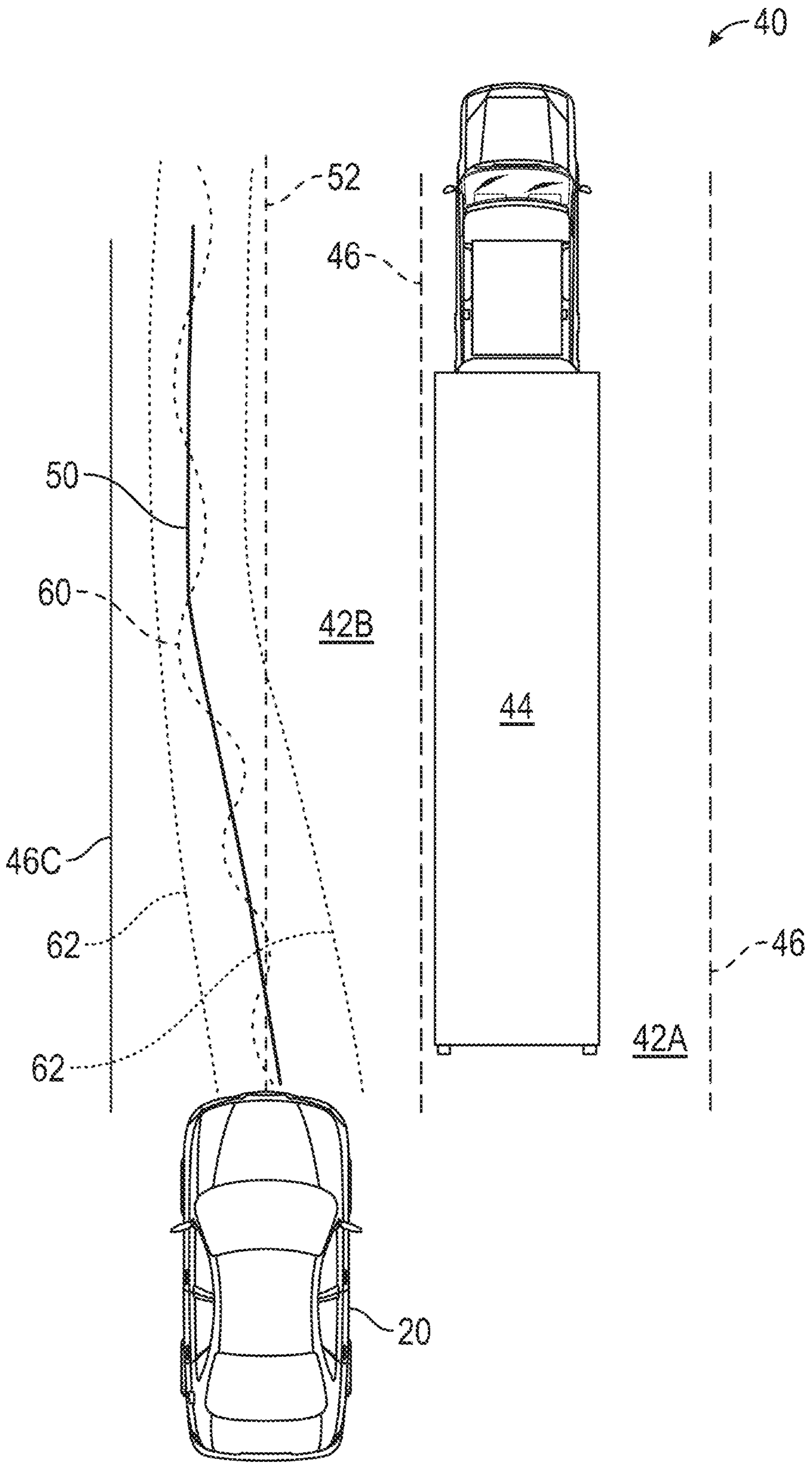
FIG. 3 is a schematic diagram of the laterally offset trajectory shown in FIG. 2 and an actual trajectory of the vehicle, according to an exemplary embodiment.

It is to be appreciated that the non-linear error component of the maximum allowable in-lane lateral offset may be calculated based on a variety of different approaches. In one non-limiting embodiment, the target lane position error is determined based on a root mean squared approach. As seen in FIG. 3, the actual trajectory 60 of the vehicle 10 includes a sinusoidal profile. In the embodiment as shown in FIG. 3, the target lane position error of the laterally offset trajectory 50 is calculated based on the root mean squared approach. It is to be appreciated that the root mean squared approach to determine the target lane position error accounts for the sinusoidal profile of the actual trajectory 60 of the vehicle 10 since a running average would yield almost no error. FIG. 3 illustrates a trajectory error 62 of the vehicle 10. As seen in FIG. 3, as the vehicle 10 follows the laterally offset trajectory 50, the trajectory error 62 shrinks or is reduced in size as feedforward compensation is applied to reduce overshoot.

The root mean squared approach to determine the target lane position error is calculated based on Equation 1, which is as follows:

$$\text{TgtLane\_Position\_Error} = \frac{\sqrt{\sum_{Buffer0}^{MaxSamplebuffersize} TgtErr^2}}{\text{Max Sample Buffer Size}} \qquad \text{Equation 1}$$

where TgtLane_Position_Error represents the target lane position error, Max Sample Buffer Size represents a maximum number of data samples allocated for the target lane position error, and TgtErr represents the error between a planned target vehicle position 70 (FIG. 4) and an actual vehicle lateral position 74.

Figure 4:
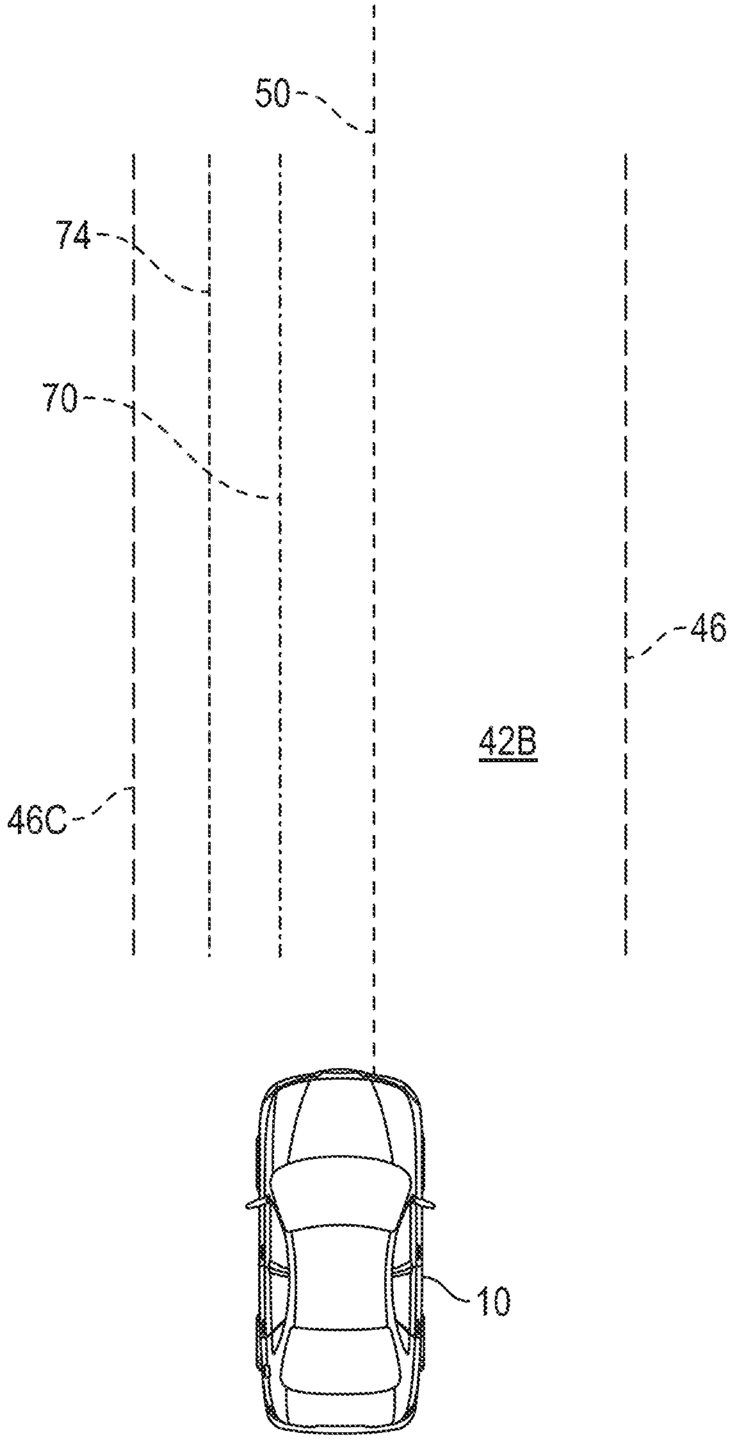
FIG. 4 is a schematic diagram of a planned target vehicle position and the actual vehicle lateral position, according to an exemplary embodiment.

In another embodiment, the one or more controllers 20 may calculate the target lane position error based on a standard deviation approach. The standard deviation approach to determine the target lane position error is calculated based on Equation 2, which is as follows:

$$\text{TgtLane\_Position\_Error} = \frac{\sqrt{\sum_{Buffer0}^{MaxSamplebuffersize} (TgtErr - \text{TgtErr\_Mean})^2}}{\text{Max Sample Buffer Size}} \qquad \text{Equation 2}$$

where TgtErr_Mean represents an accumulated average of the error between the planned target vehicle position 70 (FIG. 4) and the actual vehicle lateral position 74 (FIG. 4).

Once the one or more controllers 20 calculate the target lane position error, the one or more controllers 20 may then calculate the maximum allowable in-lane lateral offset. The maximum allowable in-lane lateral offset is based on a lane width of the host lane 42B that the vehicle 10 is traveling along, a width of the vehicle 10, the target lane position error, and the buffer distance 56 (FIG. 2). In one embodiment, the maximum allowable in-lane lateral offset is determined based on Equation 3, which is:

$$\text{Max Allowed Lateral Offset} = \frac{(\text{Lane Width} - \text{Host vehicle width})}{2} - \text{TgtLane\_Position\_Error} - \text{Buffer} \qquad \text{Equation 3}$$

where Lane Width represents the lane width of the host lane 42B that the vehicle 10 is traveling along, Host vehicle width represents the width of the vehicle 10, and Buffer represents the buffer distance 56.

The one or more controllers 20 may then compare the maximum allowable in-lane lateral offset with an arbitrated in-lane lateral offset value, where the arbitrated in-lane lateral offset value and the maximum allowable in-lane lateral offset are both oriented in the same direction. The arbitrated in-lane lateral offset value represents the current lateral offset value of the laterally offset trajectory 50 of the vehicle 10. In response to determining the arbitrated in-lane lateral offset value is greater than the maximum allowable in-lane lateral offset, the one or more controllers 20 update the laterally offset trajectory 50 of the vehicle 10 with the maximum allowable in-lane lateral offset in the appropriate direction. Otherwise, the one or more controllers 20 update the laterally offset trajectory 50 of the vehicle with the arbitrated in-lane lateral offset value in the appropriate direction.

It is to be appreciated that the one or more controllers 20 may apply a rate limiter to either the maximum allowable in-lane lateral offset or the arbitrated in-lane lateral offset value in real-time while instructing the vehicle 10 travel along the laterally offset trajectory 50 to reduce steering oscillations and the severity of trajectory overshoot. The speed at which the rate limiter is applied is based on the difference between the laterally offset trajectory 50 and the actual trajectory 60 (shown in FIG. 3) of the vehicle 10. Specifically, the greater the difference between the laterally offset trajectory 50 and the actual trajectory 60 of the vehicle 10, the slower the application of the rate limiter. For example, if there is a relatively small difference between the laterally offset trajectory 50 and the actual trajectory 60 of the vehicle 10, then the speed of the rate limiter may be increased. In one non-limiting embodiment, the one or more controllers 20 store a one-dimensional look-up table that indicates values of the rate limiter based on the target lane position error.

Figure 5:
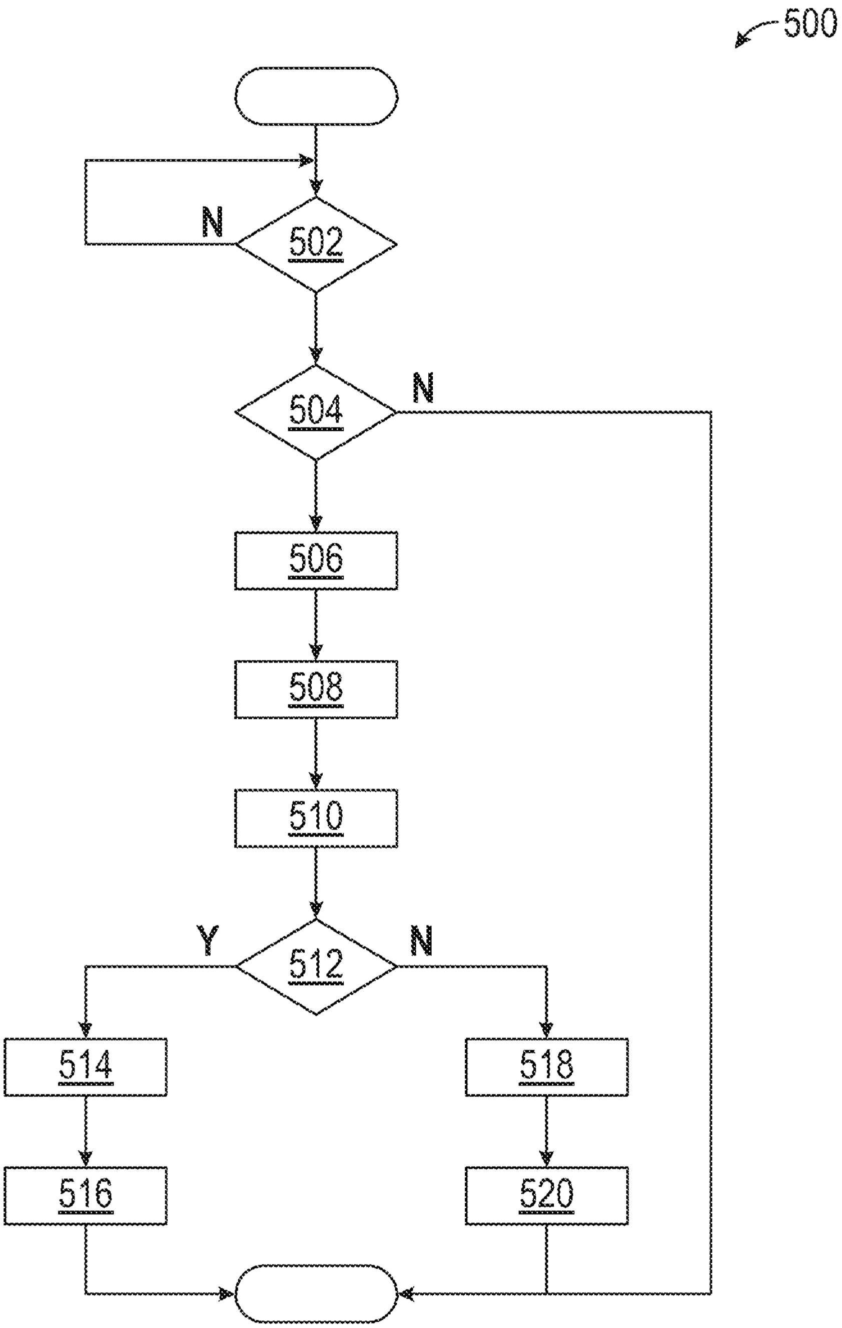
FIG. 5 is a process flow diagram illustrating a method for determining and executing the laterally offset trajectory of the vehicle, according to an exemplary embodiment.

FIG. 5 is a process flow diagram illustrating a method 500 for executing the laterally offset trajectory 50 of the vehicle 10. Referring to FIGS. 1-2 and 5, the method 500 may begin at block decision 502. In block decision 502, the one or more controllers 20 of the trajectory planning system 12 continue to monitor the perception data collected by the plurality of perception sensors 22 until determining the occurrence of the offset event that requires the vehicle to deviate from its original trajectory. For example, as seen in FIG. 2, the one or more controllers 20 may determine the moving obstacle 44 (the semi-truck) is encroaching upon the host lane 42B the vehicle 10 is traveling along. The method 500 may then proceed to decision block 504.

In decision block 504, response to determining the presence of the offset event, the one or more controllers 20 of the vehicle 10 confirms the autonomous driving features for the vehicle 10 have been activated. In response to determining the autonomous driving features have not been activated, the method 500 may then terminate. Otherwise, the method 500 may proceed to block 506.

In block 506, the one or more controllers 20 of the trajectory planning system 12 position the vehicle 10 within the host lane 42B of travel so as to avoid contact with the lane boundaries 46 and the please-ability boundary 58, and to avoid overshoot introduced by the control error as the vehicle 10 travels along the laterally offset trajectory 50. The method 500 may then proceed to block 508.

In block 508, the one or more controllers 20 may first calculate the non-linear error component of the maximum allowable in-lane lateral offset. It is to be appreciated that the non-linear error component is calculated as a function of a target lane position error across a relevant time window. As explained above, the target lane position error may be calculated based on a variety of different approaches. The method 500 may then proceed to block 510.

In block 510, the one or more controllers 20 calculate the maximum allowable in-lane lateral offset based on the lane width of the host lane 42B that the vehicle 10 is traveling along, the width of the vehicle 10, the target lane position error, and the buffer distance 56. Specifically, in one embodiment, the maximum allowable in-lane lateral offset is determined based on Equation 3 above. The method 500 may then proceed to decision block 512.

In decision block 512, the one or more controllers 20 compare the maximum allowable in-lane lateral offset with the arbitrated in-lane lateral offset value. In response to determining the arbitrated in-lane lateral offset value is greater than the maximum allowable in-lane lateral offset, the method 500 may proceed to block 514. In block 514, the one or more controllers 20 update the laterally offset trajectory 50 of the vehicle 10 with the maximum allowable in-lane lateral offset determined in block 510, and the method 500 may then proceed to block 516. In block 516, the one or more controllers 20 apply a rate limiter to the maximum lateral offset in real-time while instructing the vehicle 10 travel along the laterally offset trajectory 50. The method 500 may then terminate.

Returning to decision block 512, in response to determining the arbitrated in-lane lateral offset value is equal to or less than the maximum allowable in-lane lateral offset, the method 500 may proceed to block 518. In block 518, the one or more controllers 20 update the laterally offset trajectory 50 of the vehicle 10 with the arbitrated in-lane lateral offset value, and the method 500 may then proceed to block 520. In block 520, the one or more controllers 20 apply a rate limiter to the arbitrated in-lane lateral offset value in real-time while instructing the vehicle 10 travel along the laterally offset trajectory 50. The method 500 may then terminate.

Figure 6:
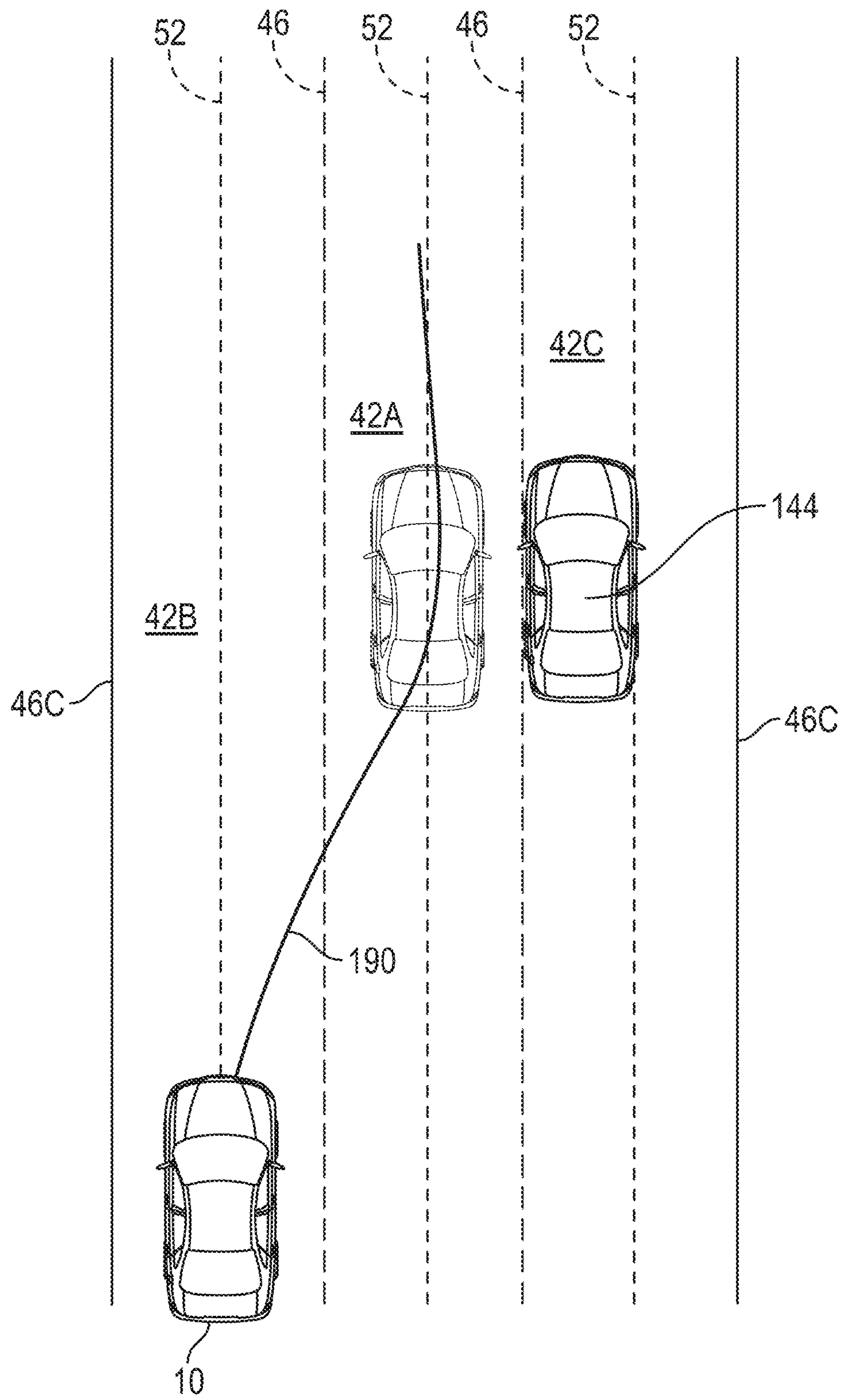
FIG. 6 is a schematic diagram of the vehicle performing a lane change maneuver by following an original trajectory, where an emergent side threat is located in a border lane, according to an exemplary embodiment.

Referring to both FIGS. 1 and 6, in another embodiment, the trajectory planning system 12 maintains at least a lateral separation threshold distance K1 (shown in FIG. 7) between the vehicle 10 and a side obstacle 144 as the vehicle 10 executes a lane change maneuver to switch travel from the host lane 42B to a neighboring lane 42A. As seen in FIG. 6, the side obstacle 144 is located in a bordering lane 42C that is positioned adjacent to the neighboring lane 42A. The side obstacle 144 represents a moving object that may encroach upon the neighboring lane 42A as the vehicle 10 performs the lane change maneuver. Specifically, in the embodiment as shown in FIG. 6, the side obstacle 144 is an automobile that is not centered along the center 52 of the host lane 42B, however, it is to be appreciated that other moving obstacles that travel along the border lane 42C may be used as well.

Figure 7:
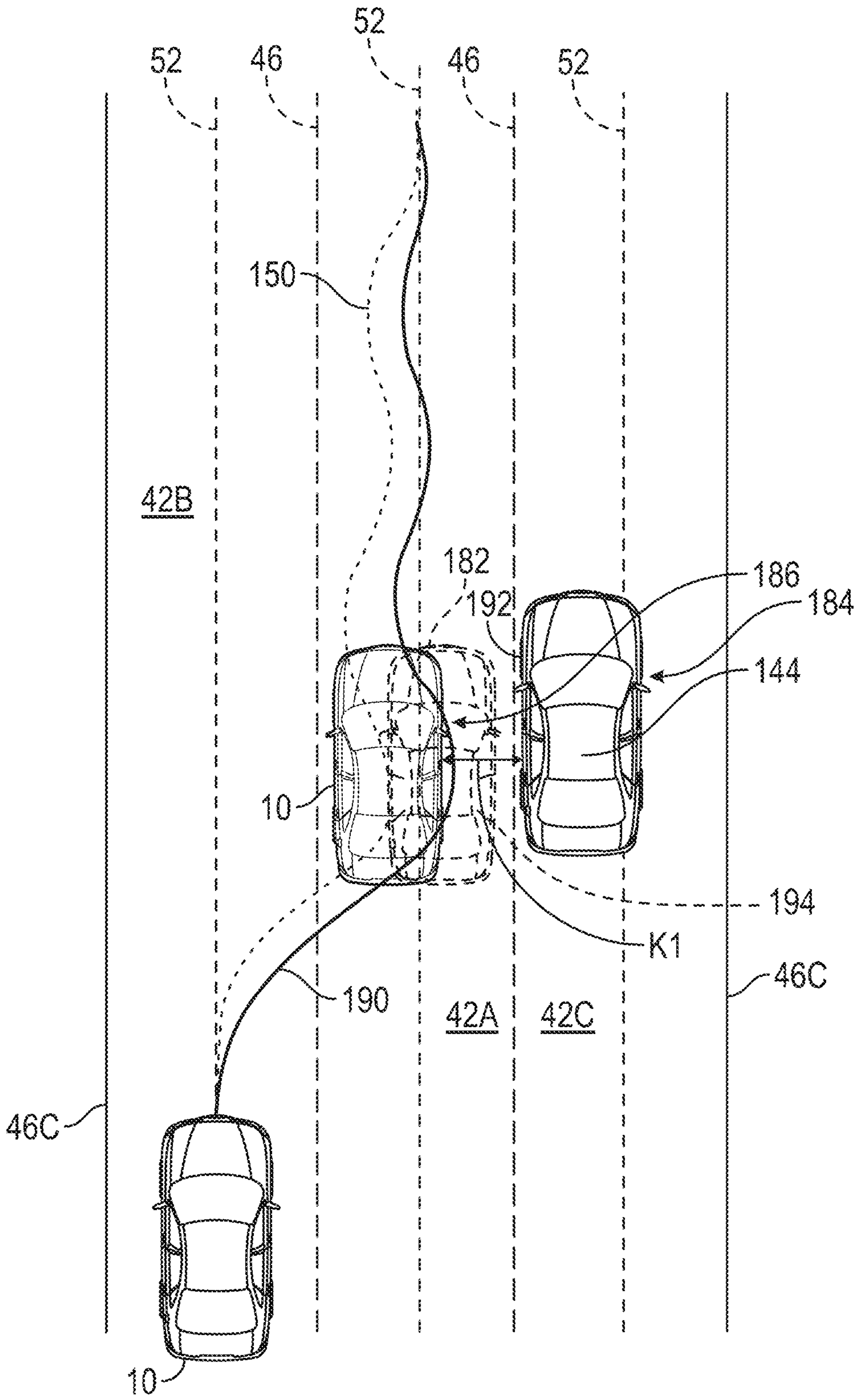
FIG. 7 is a schematic diagram of the vehicle shown in FIG. 6 performing the lane change maneuver by following a laterally offset trajectory, according to an exemplary embodiment.

FIG. 6 illustrates an original trajectory 190 as the vehicle 10 executes the lane change maneuver, where the original trajectory 190 omits the lateral separation threshold distance K1. FIG. 7 illustrates the original trajectory 190 and a laterally offset lane change trajectory 150. The vehicle 10 follows the laterally offset lane change trajectory 150 while executing the lane change maneuver to switch from the host lane 42B to the neighboring lane 42A. As seen in FIG. 7, the laterally offset lane change trajectory 150 incorporates the lateral separation threshold distance K1 measured between the vehicle 10 and the moving obstacle 144. The laterally offset lane change trajectory 50 is offset with respect to the center 52 of the neighboring lane 42A to maintain the lateral separation threshold distance K1.

It is to be appreciated that the original trajectory 190 of the vehicle 10 does not consider overshoot 186 oriented in a direction towards the side obstacle 144 located in the border lane 42C, where the overshoot 186 is caused by accumulated target lane lateral offset error. However, as seen in FIG. 7, the overshoot 186 places the vehicle 10 within close proximity of the side obstacle 144 while performing the lane change maneuver. Therefore, in response to determining the vehicle 10 is performing a lane change maneuver and the presence of the side obstacle 144 in the border lane 42C, the one or more controllers 20 of the trajectory planning system 12 calculates the laterally offset lane change trajectory 150 (shown in FIG. 7) that compensates for the overshoot 186.

Referring to FIGS. 1, 6, and 7, the one or more controllers 20 of the vehicle 10 may monitor the perception data collected by the plurality of perception sensors 22 indicative of the exterior environment 14 surrounding the vehicle 10 to detect the presence of the side obstacle 144. The one or more controllers 20 may then determine the vehicle 10 is about to perform a lane change maneuver based on any number of approaches. For example, in one embodiment, the one or more controllers 20 determine the vehicle 10 is about to perform a lane change maneuver in response to determining a user has selected a lane change indicator.

In response to determining the presence of the side obstacle 144 based on the perception data, and in response to determining the vehicle 10 is about to perform the lane change maneuver, the one or more controllers 20 then calculate an estimated lateral separation distance between the vehicle 10 and the side obstacle 144 based on the original trajectory 190 of the vehicle 10. The estimated lateral separation distance represents an absolute value of a difference between an estimated position 184 of the side obstacle 144 and a target estimated position 182 of the vehicle 10 which is shown in phantom line (estimated lateral separation distance=abs (estimated position 184–target estimated position 182). The target estimated position 182 of the vehicle 10 is based on traveling along the original trajectory 190 of the vehicle 10.

The estimated position 184 of the side obstacle 144 represents a lateral position of an opposing edge 192 of the side obstacle 144, where the opposing edge 192 of the side obstacle 144 faces the vehicle 10. In the exemplary embodiment as illustrated, the opposing edge 192 of the side obstacle 144 is oriented to the left. The target estimated position 182 of the vehicle 10 represents a lateral position of an opposing edge 194 of the vehicle 10 that faces the side obstacle 144. In the example as shown in the figures, the opposing edge 194 is oriented to the right.

The one or more controllers 20 may then compare the estimated lateral separation distance with the lateral separation threshold distance K1 that is a calibratable value that is set to capture the $95^{th}$ percentile of customers that are part of a bell curve distribution. In response to determining the estimated lateral separation distance is less than the lateral separation threshold distance K1, the one or more controllers 20 may then calculate a target lane lateral offset error. The target lane lateral offset error is a moving average of error between the laterally offset lane change trajectory 150 and an actual trajectory of the vehicle 10 across a time window, where the time window is measured as the vehicle 10 executes the lane change maneuver. It is to be appreciated that the target lane lateral offset error may be calculated based on a variety of different approaches such as, for example, the root mean squared approach or the standard deviation approach.

The one or more controllers 20 may then compare the target lane lateral offset error with a threshold maximum allowable error value K2 that is a calibratable value that is determined based on real-life test data. In one embodiment, the one or more controllers 20 store a look-up table that includes threshold maximum allowable error values based on real-life test data.

In response to determining the target lane lateral offset error is less than the threshold maximum allowable error value K2, the one or more controllers 20 may then calculate a lateral offset correction value that compensates for the overshoot 186 that is in the original trajectory 190 of the vehicle 10, where the lateral offset correction value maintains the lateral separation threshold distance K1 (seen in FIG. 7) measured between the vehicle 10 and the side obstacle 144 as the vehicle 10 follows the laterally offset lane change trajectory 150. In one embodiment, the lateral offset correction value is the absolute value of a difference between the estimated lateral separation distance and the lateral separation threshold distance K1 (lateral offset correction=abs (estimated lateral separation distance-lateral separation threshold distance K1)).

Referring generally to the figures, the disclosed trajectory planning system provides various technical effects and benefits. Specifically, the disclosed trajectory planning system provides an approach for dynamically adjusting the maximum allowable in-lane lateral offset for the laterally offset trajectory based on non-linear error, where the non-linear error is created in real-time as the vehicle deviates from the laterally offset trajectory. It is also to be appreciated that the trajectory planning system also accounts for established boundaries while determining the laterally offset trajectory. Furthermore, the trajectory planning system may also be used to maintain a lateral separation threshold distance between the vehicle and a side obstacle as the vehicle executes a lane change maneuver to switch travel from the host lane to a neighboring lane.

The modules may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the modules may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A trajectory planning system that calculates a laterally offset trajectory based on a maximum allowable in-lane lateral offset with respect to the center of a host lane of a vehicle, the trajectory planning system comprising:

one or more controllers that receive perception data indicative of an exterior environment surrounding the vehicle collected by a plurality of perception sensors that are part of the vehicle, the one or more controllers including one or more processors that execute instructions to:

monitor the perception data collected by the plurality of perception sensors until determining an occurrence of an offset event requiring the vehicle to deviate from an original trajectory;

in response to determining the occurrence of the offset event, calculate a non-linear error component of the maximum allowable in-lane lateral offset with respect to the center of a host lane, wherein the non-linear error component is calculated as a function of a target lane position error across a relevant time window;

calculate the maximum allowable in-lane lateral offset based on a lane width of the host lane, a width of the vehicle, the target lane position error, and a buffer distance, wherein the maximum allowable in-lane lateral offset is dynamically adjusted based on non-linear error created in real-time as the vehicle deviates from the laterally offset trajectory;

compare the maximum allowable in-lane lateral offset with an arbitrated in-lane lateral offset value, wherein the arbitrated in-lane lateral offset value and the maximum allowable in-lane lateral offset are both oriented in the same direction;

in response to determining the arbitrated in-lane lateral offset value is greater than the maximum allowable in-lane lateral offset, update the laterally offset trajectory of the vehicle with the maximum allowable in-lane lateral offset; and apply a rate limiter to the maximum allowable in-lane lateral offset in real-time while instructing the vehicle to travel along the laterally offset trajectory.

2. The trajectory planning system of claim 1, wherein the one or more controllers execute instructions to:

in response to determining the arbitrated in-lane lateral offset value is equal to or less than the maximum allowable in-lane lateral offset, update the laterally offset trajectory of the vehicle with the arbitrated in-lane lateral offset value; and apply a rate limiter to the arbitrated in-lane lateral offset value in real-time while instructing the vehicle to travel along the laterally offset trajectory.

3. The trajectory planning system of claim 1, wherein the target lane position error is determined based on a root mean squared approach.

4. The trajectory planning system of claim 3, wherein the target lane position error is determined by:

$$\text{TgtLane\_Position\_Error} = \frac{\sqrt{\sum_{Buffer0}^{MaxSamplebuffersize} TgtErr^2}}{\text{Max Sample Buffer Size}}$$

wherein TgtLane_Position_Error represents the target lane position error, Max Sample Buffer Size represents a maximum number of data samples allocated, and TgtErr represents an error between between a planned target vehicle position and an actual vehicle lateral position.

5. The trajectory planning system of claim 1, wherein the target lane position error is determined based on a standard deviation approach.

6. The trajectory planning system of claim 5, wherein the target lane position error is determined by:

$$\text{TgtLane\_Position\_Error} = \frac{\sqrt{\sum_{Buffer0}^{MaxSamplebuffersize} (TgtErr - \text{TgtErr\_Mean})^2}}{\text{Max Sample Buffer Size}}$$

wherein TgtLane_Position_Error represents the target lane position error, Max Sample Buffer Size represents a maximum number of data samples allocated, and TgtErr_Mean represents an accumulated average of error between a planned target vehicle position and an actual vehicle lateral position.

7. The trajectory planning system of claim 1, wherein the buffer distance is measured between a lane boundary of the host lane and a please-ability boundary disposed along the host lane, wherein the lane boundary is positioned along an opposite side of the host lane from where the offset event occurs.

8. The trajectory planning system of claim 1, wherein the maximum allowable in-lane lateral offset is determined based on:

$$\text{Max Allowed Lateral Offset} = \frac{(\text{Lane Width} - \text{Host vehicle width})}{2} - \text{TgtLane\_Position\_Error} - \text{Buffer}$$

wherein TgtLane_Position_Error represents the target lane position error, Lane Width represents the lane width of the host lane, Host vehicle width represents the width of the vehicle, and Buffer represents the buffer distance.

9. The trajectory planning system of claim 1, wherein the arbitrated in-lane lateral offset value represents a current lateral offset value of the laterally offset trajectory of the vehicle.

10. The trajectory planning system of claim 1, wherein the offset event is one of the following: a moving obstacle traveling in an adjacent lane that encroaches upon the host lane, aggressive road curvature, a driver request, and a reaction to avoid oncoming traffic.

11. The trajectory planning system of claim 10, wherein the offset event is the moving obstacle traveling in the adjacent lane, and wherein the moving obstacle is another vehicle.

12. The trajectory planning system of claim 1, wherein the one or more controllers store a one-dimensional look-up table that indicates values of the rate limiter based on the target lane position error.

13. The trajectory planning system of claim 1, wherein the one or more controllers execute instructions to:

monitor the perception data collected by the plurality of perception sensors indicative of the exterior environment surrounding the vehicle until detecting the presence of a side obstacle located in a bordering lane; and in response to detecting the presence of a side obstacle, determine the vehicle is about to perform a lane change maneuver, wherein the vehicle follows a laterally offset lane change trajectory while executing the lane change maneuver to switch from the host lane to a neighboring lane when executing the lane change maneuver, and the bordering lane that includes the side obstacle is adjacent to the neighboring lane.

14. The trajectory planning system of claim 13, wherein the one or more controllers execute instructions to:

in response to determining the presence of the side obstacle and determining the vehicle is about to perform the lane change maneuver, calculate an estimated lateral separation distance between the vehicle and the side obstacle based on an original trajectory of the vehicle;

compare the compare the estimated lateral separation distance with a lateral separation threshold distance measured between the vehicle and the side obstacle; and in response to determining the estimated lateral separation distance is less than the lateral separation threshold distance, calculate a target lane lateral offset error.

15. The trajectory planning system of claim 14, wherein the one or more controllers execute instructions to:

compare the target lane lateral offset error with a threshold maximum allowable error value; and in response to determining the target lane lateral offset error is less than the threshold maximum allowable error value, calculate a lateral offset correction value, wherein the lateral offset correction value maintains the lateral separation threshold distance measured between the vehicle and the side obstacle as the vehicle follows the laterally offset lane change trajectory.

16. A method for calculating a laterally offset trajectory based on a maximum allowable in-lane lateral offset with respect to the center of a host lane of a vehicle, the method comprising:

monitoring, by one or more controllers, perception data collected by a plurality of perception sensors until determining an occurrence of an offset event requiring the vehicle to deviate from an original trajectory;

in response to determining the occurrence of the offset event, calculating a non-linear error component of the maximum allowable in-lane lateral offset with respect to the center of a host lane, wherein the non-linear error component is calculated as a function of a target lane position error across a relevant time window;

calculating the maximum allowable in-lane lateral offset based on a lane width of the host lane, a width of the vehicle, the target lane position error, and a buffer distance, wherein the maximum allowable in-lane lateral offset is dynamically adjusted based on non-linear error created in real-time as the vehicle deviates from the laterally offset trajectory;

comparing the maximum allowable in-lane lateral offset with an arbitrated in-lane lateral offset value, wherein the arbitrated in-lane lateral offset value and the maximum allowable in-lane lateral offset are both oriented in the same direction;

in response to determining the arbitrated in-lane lateral offset value is greater than the maximum allowable in-lane lateral offset, updating the laterally offset trajectory of the vehicle with the maximum allowable in-lane lateral offset; and applying a rate limiter to the maximum allowable in-lane lateral offset in real-time while instructing the vehicle to travel along the laterally offset trajectory.

17. The method of claim 16, wherein the method further comprises:

in response to determining the arbitrated in-lane lateral offset value is equal to or less than the maximum allowable in-lane lateral offset, updating the laterally offset trajectory of the vehicle with the arbitrated in-lane lateral offset value; and applying a rate limiter to the arbitrated in-lane lateral offset value in real-time while instructing the vehicle to travel along the laterally offset trajectory.

18. The method of claim 16, further comprising:

determining the target lane position error based on a root mean squared approach.

19. The method of claim 16, further comprising:

determining the target lane position error based on a standard deviation approach.

20. A trajectory planning system that calculates a laterally offset trajectory based on a maximum allowable in-lane lateral offset with respect to the center of a host lane of a vehicle, the trajectory planning system comprising:

one or more controllers that receive perception data indicative of an exterior environment surrounding the vehicle collected by a plurality of perception sensors that are part of the vehicle, the one or more controllers including one or more processors that execute instructions to:

monitor the perception data collected by the plurality of perception sensors until determining an occurrence of an offset event requiring the vehicle to deviate from an original trajectory;

in response to determining the occurrence of the offset event, calculate a non-linear error component of the maximum allowable in-lane lateral offset with respect to the center of a host lane, wherein the non-linear error component is calculated as a function of a target lane position error across a relevant time window;

calculate the maximum allowable in-lane lateral offset based on a lane width of the host lane, a width of the vehicle, the target lane position error, and a buffer distance, wherein the maximum allowable in-lane lateral offset is dynamically adjusted based on non-linear error created in real-time as the vehicle deviates from the laterally offset trajectory;

compare the maximum allowable in-lane lateral offset with an arbitrated in-lane lateral offset value, wherein the arbitrated in-lane lateral offset value and the maximum allowable in-lane lateral offset are both oriented in the same direction;

in response to determining the arbitrated in-lane lateral offset value is greater than the maximum allowable in-lane lateral offset, update the laterally offset trajectory of the vehicle with the maximum allowable in-lane lateral offset;

apply a rate limiter to the maximum allowable in-lane lateral offset in real-time while instructing the vehicle to travel along the laterally offset trajectory;

monitor the perception data collected by the plurality of perception sensors indicative of the exterior environment surrounding the vehicle until detecting the presence of a side obstacle located in a bordering lane;

in response to detecting the presence of a side obstacle, determine the vehicle is about to perform a lane change maneuver, wherein the vehicle follows a laterally offset lane change trajectory while executing the lane change maneuver to switch from the host lane to a neighboring lane when executing the lane change maneuver, and the bordering lane that includes the side obstacle is adjacent to the neighboring lane;

in response to determining the presence of the side obstacle and determining the vehicle is about to perform the lane change maneuver, calculate an estimated lateral separation distance between the vehicle and the side obstacle based on an original trajectory of the vehicle;

compare the compare the estimated lateral separation distance with a lateral separation threshold distance measured between the vehicle and the side obstacle;

in response to determining the estimated lateral separation distance is less than the lateral separation threshold distance, calculate a target lane lateral offset error;

compare the target lane lateral offset error with a threshold maximum allowable error value; and in response to determining the target lane lateral offset error is less than the threshold maximum allowable error value, calculate a lateral offset correction value, wherein the lateral offset correction value maintains the lateral separation threshold distance measured between the vehicle and the side obstacle as the vehicle follows the laterally offset lane change trajectory.

* * * * *